United States Patent
Wu et al.

(10) Patent No.: US 9,615,697 B2
(45) Date of Patent: Apr. 11, 2017

(54) COMBINED PILOT VALVE MECHANISM AND A SHOWER SYSTEM APPLIED WITH THE COMBINED PILOT VALVE MECHANISM

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Yulin Wu, Xiamen (CN); Mingfu Zhang, Xiamen (CN); Bin Cao, Xiamen (CN); Huasong Zhou, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 69 days.

(21) Appl. No.: 14/151,082

(22) Filed: Jan. 9, 2014

(65) Prior Publication Data
US 2015/0090811 A1 Apr. 2, 2015

(30) Foreign Application Priority Data
Sep. 30, 2013 (CN) .......................... 2013 1 0462660

(51) Int. Cl.
*A47K 3/28* (2006.01)
*B05B 1/16* (2006.01)
(Continued)

(52) U.S. Cl.
CPC .............. *A47K 3/288* (2013.01); *B05B 1/169* (2013.01); *B05B 1/1663* (2013.01); *B05B 1/18* (2013.01);
(Continued)

(58) Field of Classification Search
CPC ... B05B 1/1618; B05B 1/1627; B05B 1/1663; B05B 1/1681; B05B 1/18; B05B 1/185; B05B 12/002; A47K 3/288; E03C 1/0408; E03C 1/0409; F16K 11/07; F16K 11/0716; F16K 31/122; F16K 31/1223;
(Continued)

(56) References Cited

U.S. PATENT DOCUMENTS

4,616,671 A * 10/1986 Steinkuhl et al. ............ 137/101
6,371,150 B1 * 4/2002 Shimada .................. 137/119.03
(Continued)

*Primary Examiner* — Arthur O Hall
*Assistant Examiner* — Cody Lieuwen
(74) *Attorney, Agent, or Firm* — Rabin & Berdo, P.C.

(57) ABSTRACT

A combined pilot valve mechanism and a shower system are applied with the combined pilot valve mechanism. By switching to close the control hole, the first water diversion hole or the second water diversion hole to control the pressures of the pressure cavity, the valve spool is driven to move to alternately close the first outlet or the second outlet, so that the inlet waterway is switched to connect to the first outlet waterway, the first water diversion hole or the second water diversion hole. As the shower system is applied with a combined pilot valve mechanism, which utilizes the control hole to switch the waterways, thus preventing the main pipe from great water pressure. The diameter of the control hole can be smaller, so that the water pressure of the button mechanism can be ignored, only friction and light elastic force of the spring exist.

17 Claims, 8 Drawing Sheets

(51) Int. Cl.
*B05B 1/18* (2006.01)
*E03C 1/04* (2006.01)
*F16K 11/07* (2006.01)

(52) U.S. Cl.
CPC ............. *E03C 1/0408* (2013.01); *F16K 11/07* (2013.01); *Y10T 137/86582* (2015.04)

(58) Field of Classification Search
CPC ............. F16K 31/1226; F16K 31/1245; Y10T 137/86582
USPC ....... 239/442, 443, 447, 541, 548, 569, 570; 137/118.02, 118.06, 119.01, 119.08; 251/25
See application file for complete search history.

(56) References Cited

U.S. PATENT DOCUMENTS

| | | | |
|---|---|---|---|
| 2009/0265848 A1* | 10/2009 | Tsai | 4/615 |
| 2012/0012676 A1* | 1/2012 | Hu | 239/525 |
| 2012/0145252 A1* | 6/2012 | Hunnicutt | 137/14 |
| 2012/0205565 A1* | 8/2012 | Balmonet et al. | 251/25 |
| 2013/0291298 A1* | 11/2013 | Zhou et al. | 4/601 |

* cited by examiner

COMBINED PILOT VALVE MECHANISM AND A SHOWER SYSTEM APPLIED WITH THE COMBINED PILOT VALVE MECHANISM

FIELD OF THE INVENTION

The present invention relates to a combined pilot valve mechanism and a shower system applied with the combined pilot valve mechanism.

BACKGROUND OF THE INVENTION

Existing shower system has many shower functions, the switch valve thereof is usually applied with a method that the switch is realized by rotating a sealing element to plug the outlet hole, the water pressure is directly working to the sealing element, so that user has to operate hard, thus making it with bad switch handle.

SUMMARY OF THE INVENTION

The present invention is provided with a combined pilot valve mechanism and a shower system applied with the combined pilot valve mechanism, which overcome the disadvantages of the existing technology.

A first technical proposal of the preset invention is as below:

A combined pilot valve mechanism, wherein comprising:

a fixed portion comprising an inlet waterway (10), a first outlet waterway (20) and a second outlet waterway (30), the first outlet waterway (20) is disposed with a first outlet (21), the second outlet waterway (30) is disposed with a second outlet (31);

a water diversion body (200) assembled to the fixed portion, the water diversion body (200) is disposed with a control hole (40) capable to connect to the two outlet waterways (20, 30) and a first water diversion hole (50) and a second water diversion hole (60) capable to connect to the second outlet waterway and the control hole;

a valve spool (100) slidably assembled inside the fixed portion, the valve spool (100) is disposed with a slim hole (110) connected to the inlet waterway (10), the valve spool (100) and the fixed portion form a pressure cavity (70), the control hole (40) and the slim hole (110) are connected to the pressure cavity (70);

by switching to close the control hole (40), the first water diversion hole (50) or the second water diversion hole (60) to control the pressures of the pressure cavity (70), the valve spool (100) is driven to move to alternately close the first outlet (21) or the second outlet (31), so that the inlet waterway (10) is switched to connect to the first outlet waterway (20), the first water diversion hole (50) or the second water diversion hole (60).

In another preferred embodiment, the valve spool (100) is slidably assembled to the fixed portion in the direction vertical to the inlet waterway (10), the first outlet (21) and the second outlet (31) are spaced arranged up and down in the direction vertical to the inlet waterway (10), the diameter of the slim hole (110) is smaller than that of the control hole (40).

In another preferred embodiment, the valve spool (100) comprising a valve shaft (120) and a first protruding sealing ring (130) and a second protruding sealing ring (140) respectively disposed to close the first outlet (21) and the second outlet (31), the two protruding sealing rings are fixed to the valve shaft (120) and are spaced arranged along the length direction of the valve shaft (120), the space between the two protruding sealing rings is corresponding to the inlet waterway (10), the slim hole (110) runs through the second protruding sealing ring (140), the pressure cavity (70) is formed between the second protruding sealing ring (140) and the fixed portion.

In another preferred embodiment, the fixed portion comprising a valve housing and a valve body fixed inside the valve housing, the inlet waterway (10) and the two outlet waterways are disposed in the valve housing, the side wall of the valve body is disposed with the first outlet (21) and the second outlet (31), the side wall of the valve body is further disposed with a water hole (11) connected to the inlet waterway (10) between the two outlets, the valve spool (100) is slidably assembled inside the valve body, the pressure cavity (70) is formed between the valve spool (100) and the valve body.

In another preferred embodiment, the fixed portion further comprising a fixed pipe (310) and an internal pipe (320), the fixed pipe (310) is fixed to the valve housing and is connected to the second outlet waterway (30), the internal pipe (320) is fixed to the valve body and is inside the fixed pipe (310) and is connected to the pressure cavity (70) and the control hole (40), the water diversion body (200) is fixed to the fixed pipe and the two water diversion holes are connected to the fixed pipe (310).

In another preferred embodiment, it further comprising a rotating mechanism, the rotating mechanism comprising a switch disk (410) with a sealing element (411) and a knob (420), the switch disk (410) is rotatably assembled to the water diversion body (200) to drive the sealing element (411) to switch to close the control hole (40) or the two water diversion holes, the knob (420) is rotatably assembled to the water diversion body (200) and is connected to the switch disk (410) in driving way.

A second technical proposal of the present invention is as below:

a shower system applied with the combined pilot valve mechanism according to any of claim 1 to claim 6, wherein comprising a first outlet terminal, a second outlet terminal, a third outlet terminal and a combined pilot valve mechanism, the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

In another preferred embodiment, the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

Compared to the existing technology, the technical proposal of the present invention has advantages as below:

1. The working principle of the combined pilot valve mechanism is as below:

Closing the control hole, the first water diversion hole and the second water diversion hole are open, the pressure cavity can not discharge water through the control hole, the pressure inside the pressure cavity is equal to that outside the cavity, that is to say, the pressure of the first pressed area is almost equal to that of the second pressed area, they are balanced, as the third pressed area is pressed by more water pressure, the pressure of the third pressed area holds a leading work, thus pushing the valve spool up in the direction vertical to the inlet waterway, the first protruding sealing ring opens the first outlet, the second protruding sealing ring closes the second outlet, water flows into the first outlet waterway from the first outlet through the water hole, then flows into the first outlet cavity from the first outlet waterway, so that water flows out of the head shower.

Closing the first water diversion hole, the control hole and the second water diversion hole are open, as the diameter of the slim hole is smaller than that of the control hole, the water inside the pressure cavity discharging out of the control hole is larger than the water charging in from the slim hole, so that the water pressure inside the pressure cavity is small, as the area of the first pressed area is almost equal to that of the second pressed area, the water pressure of the first pressed area is far smaller than the water pressure of the second pressed area, although the third pressed area is pressed with same high pressure as the second pressed area, as it is small area, the pressure of the second pressed area holds a leading work, thus pushing the valve spool down in the direction vertical to the inlet waterway, meanwhile, the first protruding sealing ring closes the first outlet, the second protruding sealing ring opens the second outlet, water flows to the second outlet waterway from the inlet waterway through the water hole, then flows into the second water diversion hole from the second outlet waterway, thus flows into the third outlet cavity from the second water diversion hole, so that water flows out of the hand shower.

closing the second water diversion hole, the control hole and the first water diversion hole are open, if the control hole is closed last time, then as the diameter of the slim hole is smaller than that of the control hole, the water inside the pressure cavity discharging out of the control hole is larger than the water charging in from the slim hole, so that the water pressure inside the pressure cavity is small, as the area of the first pressed area is almost equal to that of the second pressed area, the water pressure of the first pressed area is far smaller than the water pressure of the second pressed area, although the third pressed area is pressed with same high pressure as the second pressed area, as it is small area, the pressure of the second pressed area holds a leading work, thus pushing the valve spool down in the direction vertical to the inlet waterway, meanwhile, the first protruding sealing ring closes the first outlet, the second protruding sealing ring opens the second outlet, water flows to the second outlet waterway from the inlet waterway through the water hole, then flows into the first water diversion hole to the second outlet cavity from the second outlet waterway, so that water flows out of the side sprayer; if the second water diversion hole is closed last time, as the control hole is always open, the first protruding sealing ring keeps to close the first outlet, the second protruding sealing ring keeps to open the second outlet, water flows into the second outlet waterway from the inlet waterway, then flows into the first water diversion hole to the second outlet cavity from the second outlet waterway, so that water flows out of the side sprayer.

As the shower system is applied with a combined pilot valve mechanism, which utilizes the control hole to switch the waterways, thus preventing the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

2. the fixed portion is disposed with a fixed pipe and an internal pipe, the internal pipe is connected to the control hole, the internal pipe extends the on-off control distance of the control hole, the fixed pipe extends the length of the second outlet waterway, so that the knob or the rotating mechanism can be disposed far away from the head shower and near to the user's hand, thus making it convenient to switch.

BRIEF DESCRIPTION OF THE DRAWINGS

The present invention will be further described with the drawings and the embodiments.

DETAILED DESCRIPTION OF THE EMBODIMENTS

Please refer to FIG. 1 to FIG. 9, a shower system applied with a shower system applied with a combined pilot valve mechanism of a preferred embodiment is provided, the shower system comprising a first outlet terminal, a second outlet terminal, a third outlet terminal and a combined pilot valve mechanism.

The first outlet terminal is disposed with a first outlet cavity corresponding to an outlet function, the combined pilot valve mechanism is applied in the first outlet terminal. In this embodiment, the first outlet terminal is a head shower 500, the head shower 500 comprising a main section 510 and a supporting section 520, the main section 510 is disposed with the first outlet cavity, the combined pilot valve mechanism is assembled to the supporting section 520.

The second outlet terminal is disposed with a second outlet cavity corresponding to an outlet function. In this embodiment, the second outlet terminal is a side sprayer 600. The third outlet terminal is disposed with a third outlet cavity corresponding to an outlet function. In this embodiment, the third outlet terminal is a hand shower 700. The combined pilot valve mechanism comprising a fixed portion, a water diversion body 200 and a valve spool 100.

The fixed portion is disposed with an inlet waterway 10, a first outlet waterway 20 and a second outlet waterway 30, the first outlet waterway 20 is disposed with a first outlet 21, the second outlet waterway 30 is disposed with a second outlet 31, the first outlet waterway 20 is connected to the first outlet cavity. In this embodiment, the first outlet 21 and the second outlet 31 are spaced arranged up and down in the direction vertical to the inlet waterway 10. In other case, the first outlet 21 and the second outlet 31 are spaced arranged along the inlet waterway 10.

In this embodiment, the fixed portion comprising a valve housing and a valve body fixed inside the valve housing.

The valve housing comprising an upper valve housing 330 and a base 340 fixed below the upper valve housing 330, the inlet waterway 10 and the two outlet waterways are disposed in the upper valve housing 330.

The valve body comprising an upper valve body 350 and a setting base 360 fixed below the upper valve body 350, the side wall 380 of the upper valve body 350 is disposed with the first outlet 21 and the second outlet 31, the side wall of the upper valve body 350 is further disposed with a water hole connected to the inlet waterway 10 between the two outlets, the setting base 360 is disposed with a through hole 361.

In this embodiment, the fixed portion is further disposed with a fixed pipe 310 and an internal pipe 320, the fixed pipe 310 is fixed to the base 340 and is connected to the second outlet waterway 30, the internal pipe 320 is fixed to the setting base 360 and is inside the fixed pipe 310, the internal pipe 320 is connected to the pressure cavity 70 through the through hole 361 and is connected to the control hole 40.

The water diversion body 200 is assembled to the fixed portion, it is disposed with the control hole 40, a first water diversion hole 50 and a second water diversion hole 60, the control hole can be connected to the two outlet waterways 20, 30, the first water diversion hole 50 and the second water diversion hole 60 can be connected to the second outlet waterway and the control hole 40, the first water diversion hole 50 and the second water diversion hole 60 are respectively connected to the second outlet cavity and the third outlet cavity. In this embodiment, the water diversion body 200 is fixed to the fixed pipe 310 and two water diversion holes are connected to the fixed pipe 310.

The valve spool 100 is slidably assembled inside the fixed portion, the valve spool 100 is disposed with a slim hole 110 connected to the inlet waterway 10, the pressure cavity 70 is formed between the valve spool 100 and the fixed portion, the control hole 40 and the slim hole 110 are connected to the pressure cavity 70; in this embodiment, the valve spool 100 is slidably assembled to the fixed portion in the direction vertical to the inlet waterway 10. As needed, the valve spool 100 can be slidably assembled to the fixed portion along the inlet waterway 10, but not limited to this. In this embodiment, the diameter of the slim hole 110 is smaller than that of the control hole 40.

By switching to close the control hole 40, the first water diversion hole 50 or the second water diversion hole 60, the water pressure of the pressure cavity 70 is controlled to drive the valve spool 100 to move to alternately close the first outlet 21 or the second outlet 31, so that the inlet waterway 10 is switched to connect to the first outlet waterway 20, the first water diversion hole 50 and the second water diversion hole 60.

In this embodiment, the valve spool 100 is slidably assembled inside the valve body, the valve spool 100 comprising a valve shaft 120 and a first protruding sealing ring 130 and a second protruding sealing ring 140 to respectively close the first outlet 21 and the second outlet 31, two protruding sealing rings are fixed to the valve shaft and are spaced arranged along the length direction of the valve shaft 120, the space between the two protruding sealing rings are corresponding to the inlet waterway 10, the slim hole 110 runs through the second protruding sealing ring 140, the pressure cavity 70 is formed between the second protruding sealing ring 140 and the valve body.

In this embodiment, the combined pilot valve structure is further disposed with a knob mechanism, which comprises a switch disk 410 with a sealing element 411 and a knob 420, the switch disk 410 is rotatably assembled to the water diversion body 200 to drive the sealing element 411 to switch to close the control hole 40 and the two water diversion holes, the knob 420 is rotatably assembled to the water diversion body and is connected to the switch disk 410 in driving way.

Figure 1:
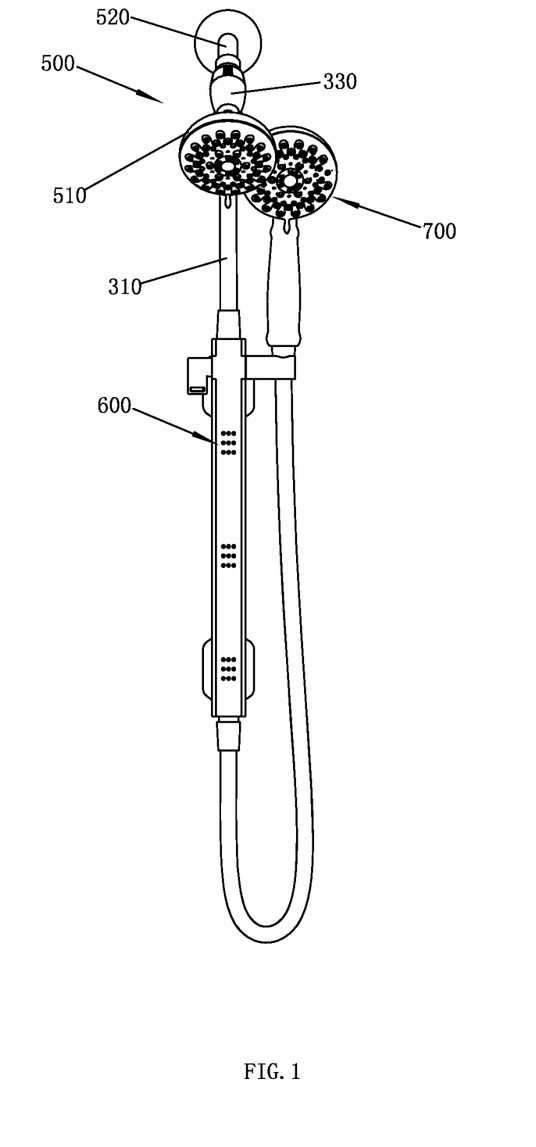
FIG. 1 illustrates a front view of the shower system of a preferred embodiment.
Figure 2:
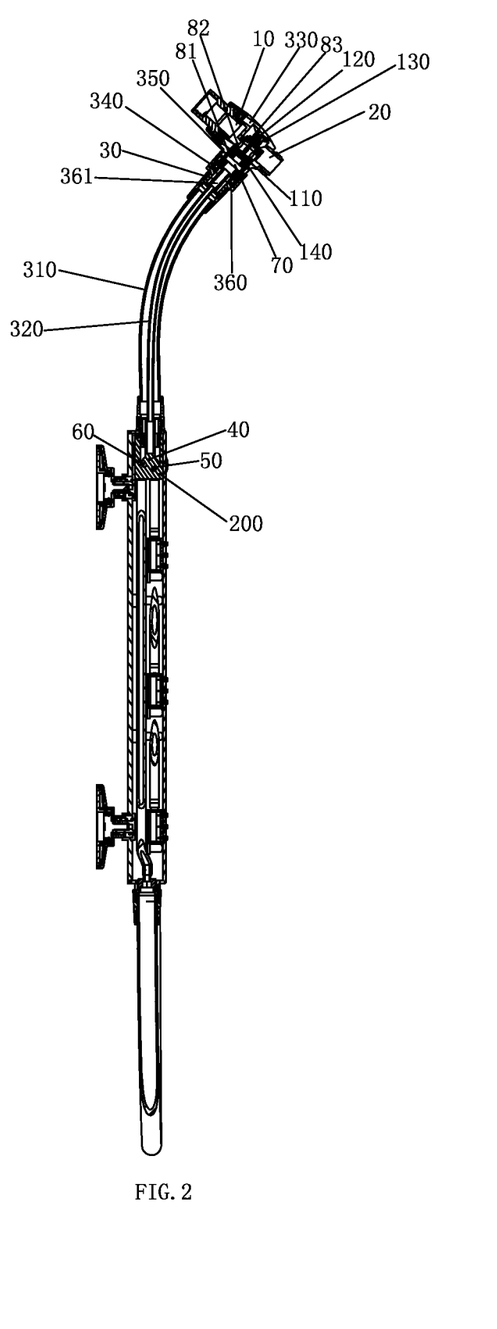
FIG. 2 illustrates a sectional view of the shower system of the preferred embodiment.
Figure 3:
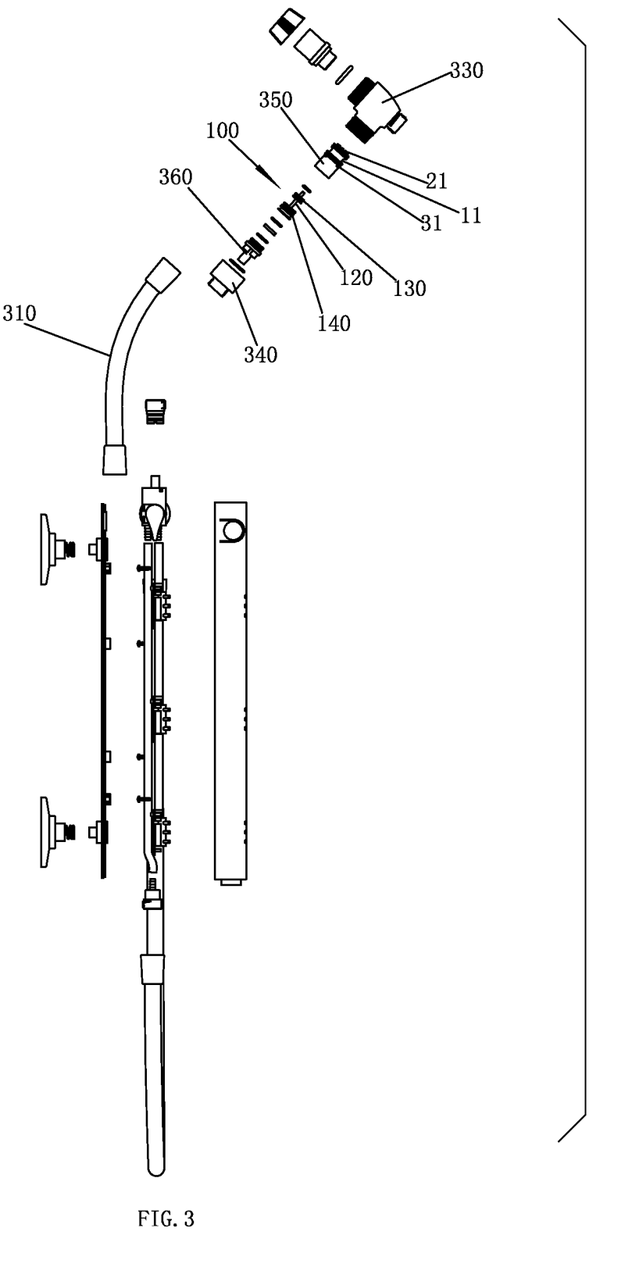
FIG. 3 illustrates a first exploded view of the shower system of the preferred embodiment.
Figure 4:
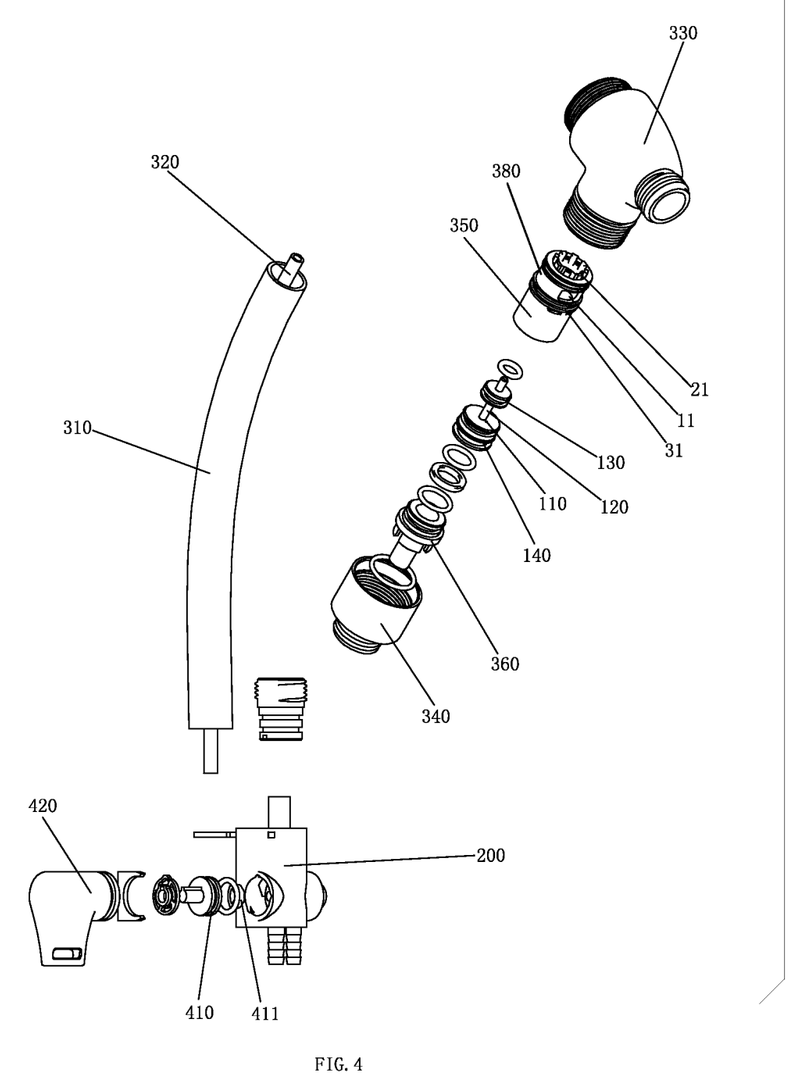
FIG. 4 illustrates a second exploded view of the shower system of the preferred embodiment.
Figure 5:
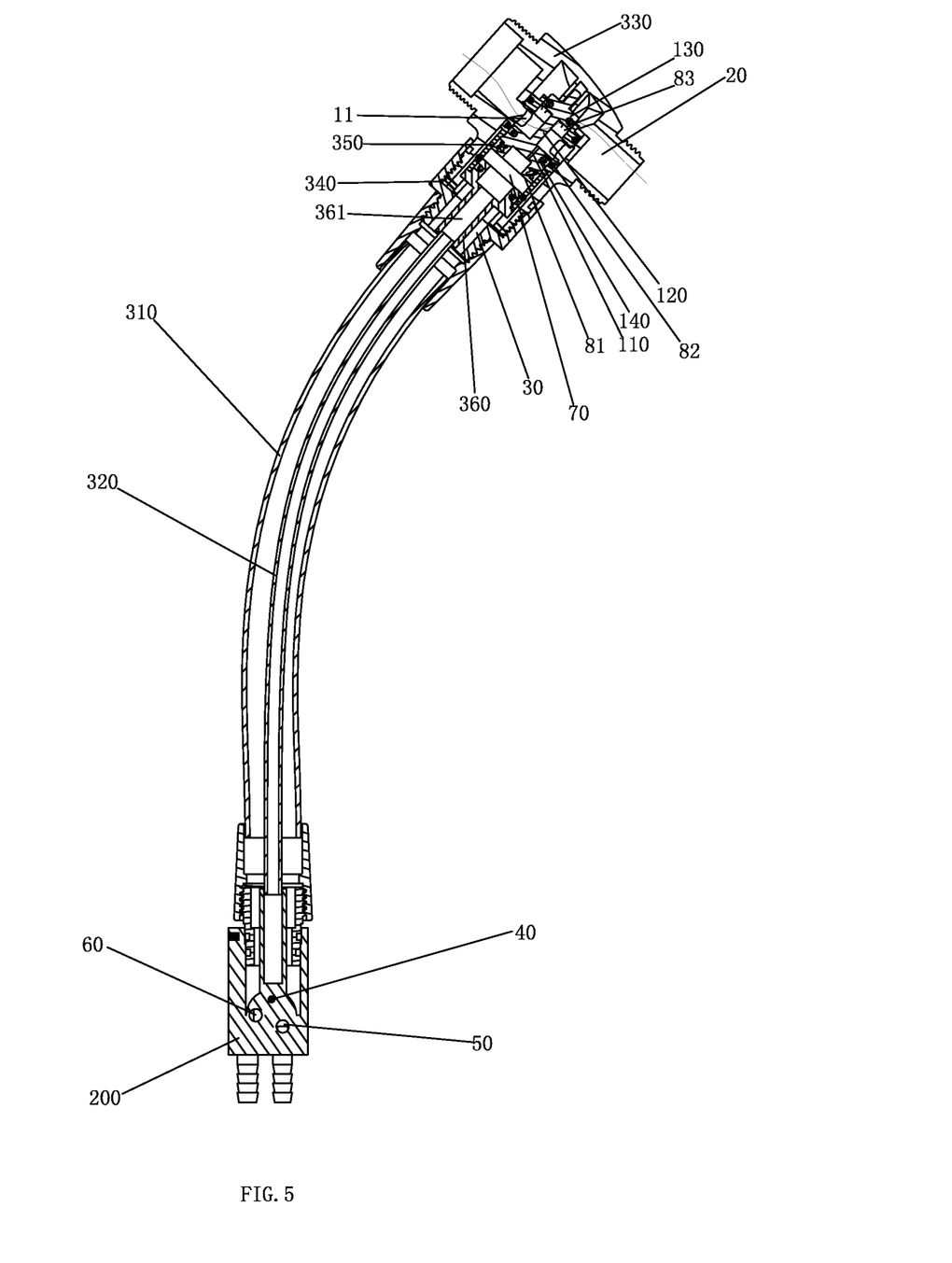
FIG. 5 illustrates a sectional view of the shower system of the preferred embodiment when water flows out of the first outlet waterway.

The switch principle of the shower system is as below:

As figured in FIG. 5, rotating the knob 420 to drive the switch disk 410 to rotate thus to drive the sealing element 411 to close the control hole, the first water diversion hole and the second water diversion hole are open, the pressure cavity can not discharge water through the control hole, the pressure inside the pressure cavity is equal to that outside the cavity, that is to say, the pressure of the first pressed area 81 is almost equal to that of the second pressed area 82, they are balanced, as the third pressed area 83 is pressed by more water pressure, the pressure of the third pressed area 83 holds a leading work, thus pushing the valve spool 100 up in the direction vertical to the inlet waterway 10, the first protruding sealing ring 130 opens the first outlet 21, the second protruding sealing ring 140 closes the second outlet 31, water flows into the first outlet waterway 20 from the first outlet 21 through the water hole 11, then flows into the first outlet cavity from the first outlet waterway, so that water flows out of the head shower 500.

Figure 6:
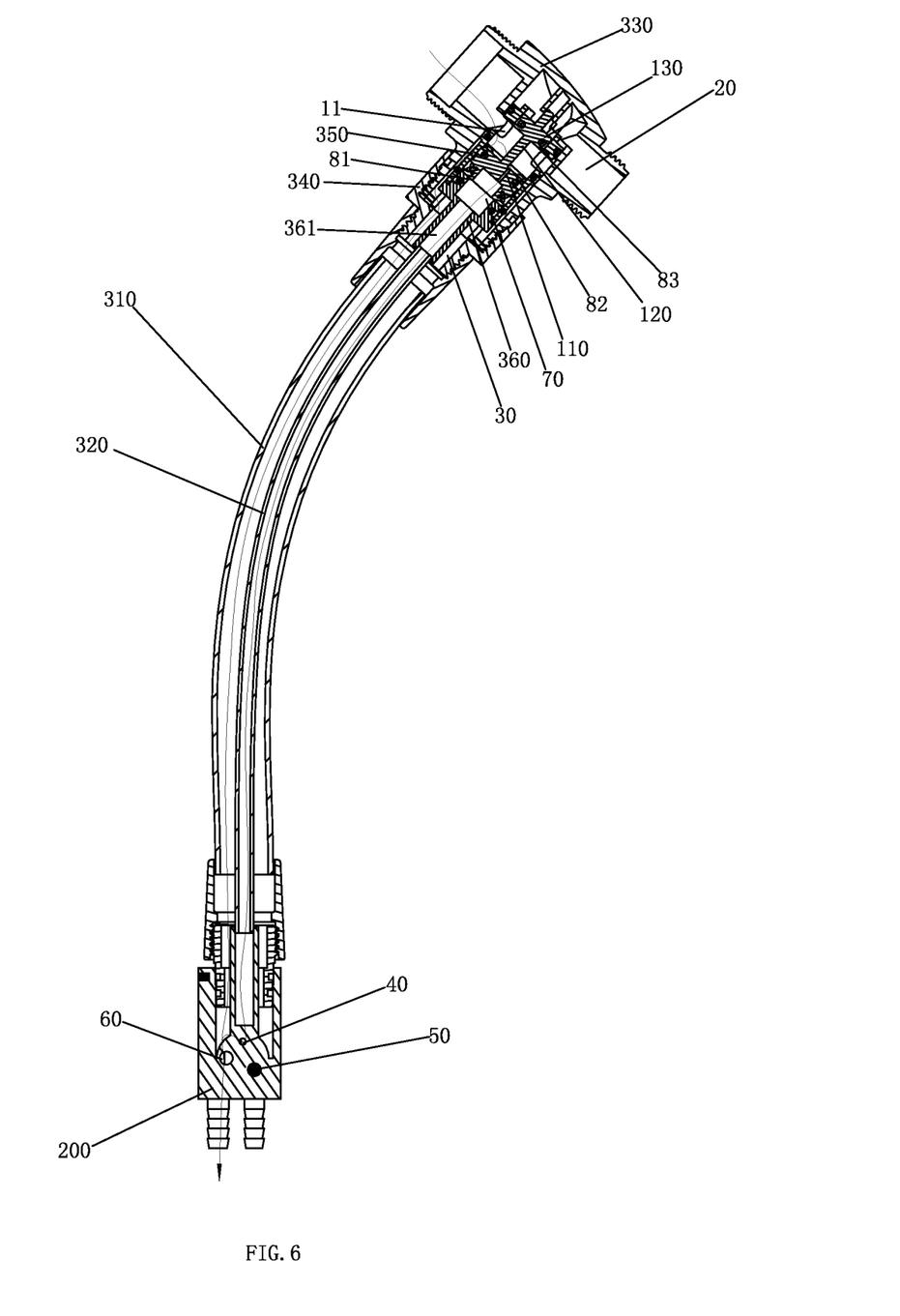
FIG. 6 illustrates a sectional view of the shower system of the preferred embodiment when water flows out of the second water diversion hole.

As figured in FIG. 6, rotating knob 420 to drive the switch disk 410 to rotate to drive the sealing element 411 to close the first water diversion hole 50, the control hole 40 and the second water diversion hole 60 are open, as the diameter of the slim hole 110 is smaller than that of the control hole 40, the water inside the pressure cavity 70 discharging out of the control hole 40 is larger than the water charging in from the slim hole 110, so that the water pressure inside the pressure cavity 70 is small, as the area of the first pressed area 81 is almost equal to that of the second pressed area 82, the water pressure of the first pressed area 81 is far smaller than the water pressure of the second pressed area 82, although the third pressed area 83 is pressed with same high pressure as the second pressed area 82, as it is small area, the pressure of the second pressed area 82 holds a leading work, thus pushing the valve spool 100 down in the direction vertical to the inlet waterway 10, meanwhile, the first protruding sealing ring 130 closes the first outlet 21, the second protruding sealing ring 140 opens the second outlet 31, water flows to the second outlet waterway 30 from the inlet waterway 10 through the water hole 11, then flows into the second water diversion hole 60 from the second outlet waterway 30, thus flows into the third outlet cavity from the second water diversion hole 60, so that water flows out of the hand shower 700.

Figure 7:
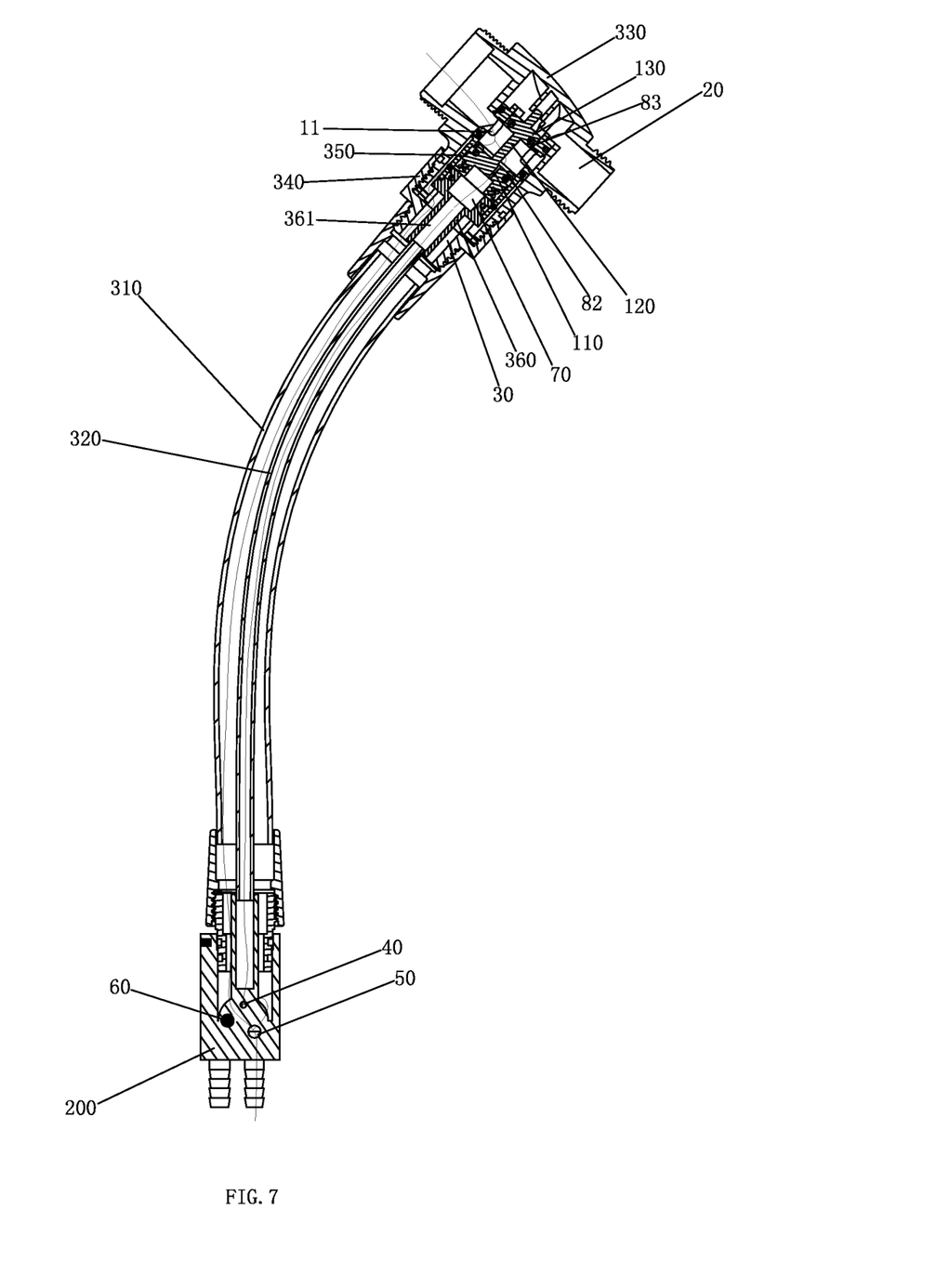
FIG. 7 illustrates a sectional view of the shower system of the preferred embodiment when water flows out of the first water diversion hole.
Figure 8:
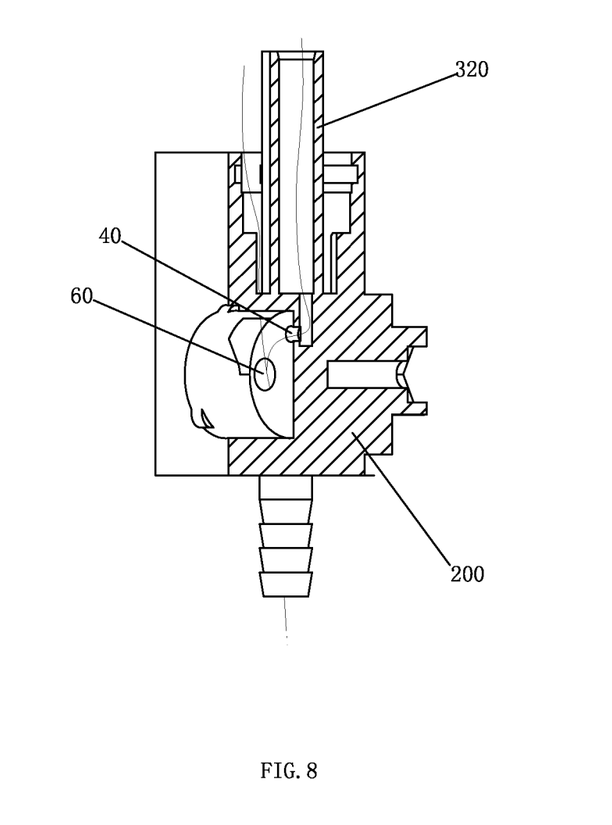
FIG. 8 illustrates a sectional view of the water diversion body of the preferred embodiment.
Figure 9:
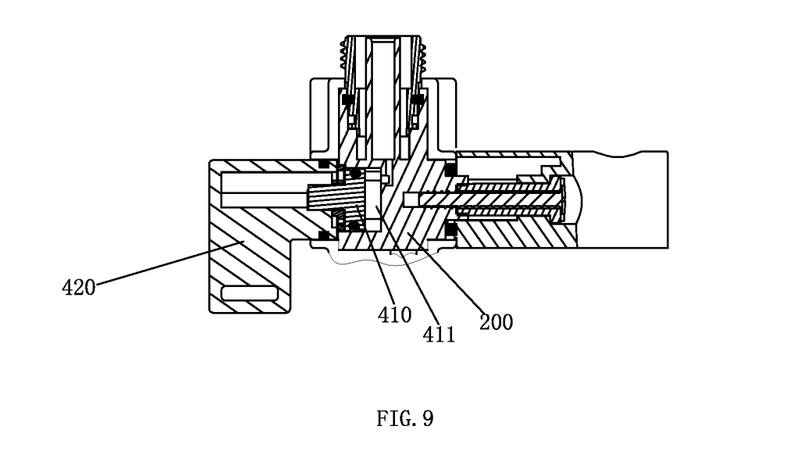
FIG. 9 illustrates a sectional view of the assembly of the water diversion body and the rotating mechanism of the preferred embodiment.

As figured in FIG. 7, rotating knob 420 to drive the switch disk 410 to rotate to drive the sealing element 411 to close the second water diversion hole 60, the control hole 40 and the first water diversion hole 50 are open, if the control hole 40 is closed last time, then as the diameter of the slim hole 110 is smaller than that of the control hole 40, the water inside the pressure cavity 70 discharging out of the control hole 40 is larger than the water charging in from the slim hole 110, so that the water pressure inside the pressure cavity 70 is small, as the area of the first pressed area 81 is almost equal to that of the second pressed area 82, the water pressure of the first pressed area 81 is far smaller than the water pressure of the second pressed area 82, although the third pressed area 83 is pressed with same high pressure as the second pressed area 82, as it is small area, the pressure of the second pressed area 82 holds a leading work, thus pushing the valve spool 100 down in the direction vertical to the inlet waterway 10, meanwhile, the first protruding sealing ring 130 closes the first outlet 21, the second protruding sealing ring 140 opens the second outlet 31, water flows to the second outlet waterway 30 from the inlet waterway 10 through the water hole 11, then flows into the first water diversion hole 50 to the second outlet cavity from the second outlet waterway 30, so that water flows out of the side sprayer 600; if the second water diversion hole 60 is closed last time, as the control hole 40 is always open, the first protruding sealing ring 130 keeps to close the first outlet 21, the second protruding sealing ring 140 keeps to open the second outlet 31, water flows into the second outlet waterway 30 from the inlet waterway 10, then flows into the first water diversion hole 50 to the second outlet cavity from the second outlet waterway 30, so that water flows out of the side sprayer 600.

As the shower system is applied with a combined pilot valve mechanism, which utilizes the control hole to switch the waterways, thus preventing the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A combined pilot valve mechanism, wherein comprising:
   a fixed portion comprising an inlet waterway (10), a first outlet waterway (20) and a second outlet waterway (30), the first outlet waterway (20) is disposed with a first outlet (21), the second outlet waterway (30) is disposed with a second outlet (31);
   a water diversion body (200) assembled to the fixed portion, the water diversion body (200) is disposed with a control hole (40) capable to connect to the two outlet waterways (20, 30) and a first water diversion hole (50) configured to be connected to each of the second outlet waterway and the control hole, and a second water diversion hole (60) configured to be connected to each of the second outlet waterway and the control hole;
   a valve spool (100) slidably assembled inside the fixed portion, the valve spool (100) is disposed with a slim hole (110) connected to the inlet waterway (10), the valve spool (100) and the fixed portion form a pressure cavity (70), the control hole (40) and the slim hole (110) are connected to the pressure cavity (70);
   by switching to close the control hole (40), the first water diversion hole (50) or the second water diversion hole (60) to control pressures of the pressure cavity (70), the valve spool (100) is driven to move to alternately close the first outlet (21) or the second outlet (31), so that the inlet waterway (10) is switched to connect to the first outlet waterway (20), the first water diversion hole (50) or the second water diversion hole (60), wherein
   the fixed portion comprising a valve housing and a valve body fixed inside the valve housing,
   the fixed portion further comprising a fixed pipe (310) and an internal pipe (320),
   the fixed pipe (310) is fixed to the valve housing and is connected to the second outlet waterway (30),
   the internal pipe (320) is fixed to the valve body and is connected to the pressure cavity (70) and the control hole (40),
   the fixed pipe (310) surrounds the internal pipe (320),
   the water diversion body (200) is fixed to the fixed pipe and the two water diversion holes are connected to the fixed pipe (310).

2. The combined pilot valve mechanism according to claim 1, wherein
   the valve spool (100) is slidably assembled to the fixed portion normal to the inlet waterway (10),
   the first outlet (21) and the second outlet (31) are spaced apart from each other along a direction normal to the inlet waterway (10),
   the diameter of the slim hole (110) is smaller than that of the control hole (40).

3. The combined pilot valve mechanism according to claim 1, wherein
   the valve spool (100) comprising a valve shaft (120) and a first protruding sealing ring (130) and a second protruding sealing ring (140) respectively disposed to close the first outlet (21) and the second outlet (31),
   the two protruding sealing rings are fixed to the valve shaft (120) and are spaced and arranged along the length direction of the valve shaft (120),
   the space between the two protruding sealing rings is corresponding to the inlet waterway (10),
   the slim hole (110) runs through the second protruding sealing ring (140),
   the pressure cavity (70) is formed between the second protruding sealing ring (140) and the fixed portion.

4. The combined pilot valve mechanism according to claim 1, wherein
   the inlet waterway (10) and the two outlet waterways are disposed in the valve housing,
   a side wall of the valve body is disposed with the first outlet (21) and the second outlet (31),
   the side wall of the valve body is further disposed with a water hole (11) connected to the inlet waterway (10) between the two outlets,
   the valve spool (100) is slidably assembled inside the valve body,
   the pressure cavity (70) is formed between the valve spool (100) and the valve body.

5. The combined pilot valve mechanism according to claim 1, wherein further comprising a rotating mechanism,
   the rotating mechanism comprising a switch disk (410) with a sealing element (411) and a knob (420),
   the switch disk (410) is rotatably assembled to the water diversion body (200) to drive the sealing element (411) to switch to close the control hole (40) or the two water diversion holes,
   the knob (420) is rotatably assembled to the water diversion body (200) and is connected to drive the switch disk (410).

6. A shower system applied with the combined pilot valve mechanism according to claim 1, wherein comprising
   a first outlet terminal,
   a second outlet terminal,
   a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

7. A shower system applied with the combined pilot valve mechanism according to claim 6, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

8. A shower system applied with the combined pilot valve mechanism according to claim 2, wherein comprising a first outlet terminal, a second outlet terminal, a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

9. A shower system applied with the combined pilot valve mechanism according to claim 3, wherein comprising a first outlet terminal, a second outlet terminal, a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

10. A shower system applied with the combined pilot valve mechanism according to claim 4, wherein comprising a first outlet terminal, a second outlet terminal, a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

11. A shower system applied with the combined pilot valve mechanism according to claim 4, wherein comprising a first outlet terminal, a second outlet terminal, a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

12. A shower system applied with the combined pilot valve mechanism according to claim 5, wherein comprising a first outlet terminal, a second outlet terminal, a third outlet terminal and the first outlet terminal, the second outlet terminal and the third outlet terminal are respectively disposed with a corresponding first outlet cavity, a second outlet cavity and a third outlet cavity, the combined pilot valve mechanism is disposed in the first outlet terminal, the first outlet waterway (20), the first water diversion hole (50) and the second water diversion hole (60) are respectively connected to the first outlet cavity, the second outlet cavity and the third outlet cavity.

13. A shower system applied with the combined pilot valve mechanism according to claim 8, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

14. A shower system applied with the combined pilot valve mechanism according to claim 9, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

15. A shower system applied with the combined pilot valve mechanism according to claim 10, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

16. A shower system applied with the combined pilot valve mechanism according to claim 11, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

17. A shower system applied with the combined pilot valve mechanism according to claim 12, wherein the first outlet terminal is a head shower (500), the second outlet terminal is a side sprayer (600), the third outlet terminal is a hand shower (700), the head shower (500) comprising a main section (510) and a supporting section (520), the main section (510) is disposed with the first outlet cavity, the combined pilot valve mechanism is assembled to the supporting section (520).

\* \* \* \* \*